(12) United States Patent
Moulsley et al.

(10) Patent No.: US 9,178,600 B2
(45) Date of Patent: Nov. 3, 2015

(54) PACKET DATA TRANSMISSION IN A MIMO SYSTEM

(75) Inventors: Timothy J. Moulsley, Caterham (GB); Matthew P. J. Baker, Canterbury (GB); Alistair S. Cameron, Fort William (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 0 days.

(21) Appl. No.: 10/528,940

(22) PCT Filed: Sep. 12, 2003

(86) PCT No.: PCT/IB03/03985
§ 371 (c)(1),
(2), (4) Date: Mar. 23, 2005

(87) PCT Pub. No.: WO2004/030238
PCT Pub. Date: Apr. 8, 2004

(65) Prior Publication Data
US 2006/0046662 A1    Mar. 2, 2006

(30) Foreign Application Priority Data
Sep. 28, 2002 (GB) .................................. 0222555.5

(51) Int. Cl.
*H04B 1/10* (2006.01)
*H04B 7/08* (2006.01)
(Continued)

(52) U.S. Cl.
CPC ............ *H04B 7/0874* (2013.01); *H04B 7/0689* (2013.01); *H04B 7/0691* (2013.01);
(Continued)

(58) Field of Classification Search
USPC ............. 455/63.1, 63.4, 67.11, 562.1, 68–69, 455/296, 226.1–226.4, 575.7, 132–136, 455/67.13
See application file for complete search history.

(56) References Cited

U.S. PATENT DOCUMENTS 3,987,444 A * 10/1976 Masak et al. .................. 342/380
4,384,366 A     5/1983 Kaitsuka
(Continued)

FOREIGN PATENT DOCUMENTS

CN        1327644 A    12/2001
DE        3817643 C1    6/1989
(Continued)

OTHER PUBLICATIONS

Sandhu et al, "Near-Optimal Selection of Transmit Antennas for a MIMO Channel Based on Shannon Capacity", Signals, Systems and Computers, vol. 1, 2000, pp. 567-571.
(Continued)

*Primary Examiner* — Edward Urban
*Assistant Examiner* — Rui Hu

(57) ABSTRACT

A packet data transmission system comprises primary stations (PS) having signal transmitting and receiving means and antennas (PA1 to PA4) for propagating downlink signals and receiving uplink signals and a plurality of secondary stations (SS) able to roam within the coverage areas of the primary stations. Each secondary station (SS1) has signal transmitting and receiving means, a predetermined number of antennas (SA1 to SA4), and means for monitoring its radio environment. Information about the radio environment is relayed as an uplink signal to the respective primary station which modifies its mode of transmission of packet data signals. The secondary station in response to the modified mode of transmission of the downlink signals adapts its receiver resources to process the packet data signals and effect cancellation of any interference.

31 Claims, 5 Drawing Sheets

(51) Int. Cl.
*H04B 7/06* (2006.01)
*H04L 5/00* (2006.01)
*H04W 28/18* (2009.01)
*H04W 8/24* (2009.01)
*H04W 24/00* (2009.01)
*H04W 28/04* (2009.01)

(52) U.S. Cl.
CPC .............. *H04B 7/0871* (2013.01); *H04L 5/006* (2013.01); *H04L 5/0023* (2013.01); *H04L 5/0042* (2013.01); *H04L 5/0062* (2013.01); *H04L 5/0085* (2013.01); *H04L 5/0091* (2013.01); *H04W 28/18* (2013.01); *H04W 8/24* (2013.01); *H04W 24/00* (2013.01); *H04W 28/04* (2013.01)

(56) References Cited

U.S. PATENT DOCUMENTS

| | | | |
|---|---|---|---|
| 4,736,455 A * | 4/1988 | Matsue et al. | 455/138 |
| 4,989,262 A * | 1/1991 | Saito | 455/138 |
| 5,117,505 A * | 5/1992 | Talwar | 455/278.1 |
| 5,818,517 A * | 10/1998 | Hudson et al. | 348/21 |
| 6,067,290 A | 5/2000 | Paulraj et al. | |
| 6,222,498 B1 | 4/2001 | Ishii et al. | |
| 6,473,467 B1 * | 10/2002 | Wallace et al. | 375/267 |
| 6,917,820 B2 | 7/2005 | Gore et al. | 455/562.1 |
| 6,968,171 B2 * | 11/2005 | Vanderhelm et al. | 455/296 |
| 7,020,110 B2 * | 3/2006 | Walton et al. | 370/334 |
| 7,047,016 B2 * | 5/2006 | Walton et al. | 455/452.1 |
| 7,068,981 B2 * | 6/2006 | Sim | 455/101 |
| 7,299,027 B2 * | 11/2007 | Sudo | 455/303 |
| 7,336,745 B2 * | 2/2008 | Casabona et al. | 375/346 |
| 7,492,830 B2 * | 2/2009 | Bocquet | 375/267 |
| 7,519,395 B2 * | 4/2009 | Mesecher et al. | 455/561 |
| 8,634,481 B1 | 1/2014 | Chung et al. | |
| 2002/0147953 A1 * | 10/2002 | Catreux et al. | 714/746 |
| 2002/0177447 A1 | 11/2002 | Walton et al. | |
| 2002/0183010 A1 * | 12/2002 | Catreux et al. | 455/67.1 |
| 2002/0193146 A1 * | 12/2002 | Wallace et al. | 455/562 |
| 2003/0003863 A1 * | 1/2003 | Thielecke et al. | 455/39 |
| 2003/0035491 A1 * | 2/2003 | Walton et al. | 375/267 |
| 2003/0125040 A1 * | 7/2003 | Walton et al. | 455/454 |
| 2003/0128658 A1 * | 7/2003 | Walton et al. | 370/208 |
| 2003/0162519 A1 * | 8/2003 | Smith et al. | 455/277.1 |
| 2003/0223391 A1 * | 12/2003 | Malaender et al. | 370/334 |
| 2003/0236080 A1 * | 12/2003 | Kadous et al. | 455/226.1 |
| 2004/0042569 A1 * | 3/2004 | Casabona et al. | 375/346 |
| 2004/0198452 A1 * | 10/2004 | Roy | 455/562.1 |
| 2006/0079221 A1 * | 4/2006 | Grant et al. | 455/423 |
| 2006/0133549 A1 * | 6/2006 | Talwar | 375/346 |

FOREIGN PATENT DOCUMENTS

| | | |
|---|---|---|
| EP | 0930727 A2 | 7/1999 |
| EP | 1207645 | 5/2002 |
| EP | 1211820 A1 | 6/2002 |
| GB | 2240695 A | 8/1991 |
| JP | 2002217752 A | 8/2002 |
| WO | 0031892 A1 | 6/2000 |
| WO | 0176110 A2 | 10/2001 |
| WO | WO 0176110 | 10/2001 |
| WO | 02/093782 A1 | 11/2002 |

OTHER PUBLICATIONS

Wolniansky et al, "V-Blast: An Architecture for Realizing Very High Data Rates Over the Rich-Scattering Wireless Channel", URSI International Symposium on Signals, Systems and Electronics, 1998, pp. 1-6.

Li et al, "Spatial Multiuser Access With MIMO Smart Antennas for OFDM Systems", Vehicular Technology Conference, vol. 3, 2001, Pabes 1553-1557.

\* cited by examiner

PACKET DATA TRANSMISSION IN A MIMO SYSTEM

The present invention relates to a packet data transmission system and further relates to primary and secondary stations for use in such a system and to a method of operating such a system. The present invention has particular, but not exclusive, application to UMTS (Universal Mobile Telecommunication System) otherwise referred to as 3GPP.

For packet radio in UMTS it has been proposed for High Speed Downlink Packet Access (HSDPA) that MIMO (Multiple Input Multiple Output antenna systems) be used. One example of a MIMO system is described in U.S. Pat. No. 6,067,290 in which the presence of multiple antennas enables spatial multiplexing whereby a data stream for transmission is split into a plurality of sub-streams, each of which is sent via many different paths. Another example, known as the BLAST system, is described in the paper "V-BLAST: an architecture for realising very high data rates over the rich-scattering wireless channel" by P W Wolniansky et al in the published papers of the 1998 URSI International Symposium on Signals, Systems and Electronics, Pisa, Italy, 29 Sep. to 2 Oct. 1998.

The performance gains which may be achieved from a MIMO system may be used to increase the total data rate at a given error rate, or to reduce the error rate for a given data rate, or some combination of the two. A MIMO system can also be controlled to reduce the total transmitted energy or power for a given data rate and error rate.

One area in which MIMO techniques may be applied is a High-Speed Downlink Packet Access (HSDPA) scheme, which is currently being developed for UMTS and which may facilitate transfer of packet data to a secondary station, for example a mobile station, at over 4 Mbps. In one proposed embodiment of HSDPA separate data streams using the same channelisation code are sent from respective antennas at a primary station, for example a base station, and the data streams can in principle be received and decoded by a secondary station having at least as many antennas as there are data streams. An ARQ (Automatic Repeat reQuest) scheme is needed to ensure correct delivery of each data packet, since accurate data transmission is viewed as more important than the reduced system throughput under poor channel conditions (due to multiple re-transmissions).

A problem with the use of a MIMO system for packet data transmission is the impact of differing radio link qualities on the communication system. The scheme can perform well with low interference levels but not with high interference levels such as will occur near a cell border where interference from primary stations in adjacent cells will greatly reduce throughput.

It is an object of the present invention to mitigate the effect of such interference in packet data transmission.

According to a first aspect of the present invention there is provided a method of operating a packet data transmission system comprising a primary station having a plurality of antennas and at least one secondary station having a plurality of antennas, the method comprising the primary station transmitting packet data on signal paths between pairs of primary and secondary station antennas, the secondary station monitoring its radio environment and sending information about its radio environment to the primary station, the primary station in response to this information adapting itself and the secondary station configuring its receiver resources for processing the received data and interference.

According to a second aspect of the present invention there is provided a packet data transmission system comprising a primary station having a plurality of antennas, signal transmitting and receiving means and means for adapting itself in response to a received signal from a secondary station, and at least one secondary station having signal transmitting and receiving means, a plurality of antennas, means for monitoring its radio environment and for transmitting a signal including information about its radio environment, and means for configuring its receiver resources for processing data signals received from the adapted primary station and interference.

The present invention is based on recognition of the fact that some of the receiver resources in a secondary station designed to receive MIMO transmissions can be used for interference cancellation. However the allocation of these resources depends on the interference conditions at the secondary station, which conditions vary for example due to the current position of the secondary station in its cell and the proximity of an interfering primary station in an adjacent cell. Therefore the secondary station monitors the conditions and makes a decision as to what resources, for example number or choice of its antennas, it would prefer to use to receive packet data from the primary station and notifies the primary station by way of uplink signalling. Some or all of the receiver's resources not allocated in this way may be used in interference cancellation of signals from primary station(s) in adjacent cells. However the decision concerning the allocation of resources is dynamic in so far that it is likely to be changed due to the conditions varying.

According to a third aspect of the present invention there is provided a secondary station for use in a packet data transmission system comprising a primary station having a plurality of antennas and signal transmitting and receiving means, the secondary station having signal transmitting and receiving means, a plurality of antennas and means for monitoring its radio environment and for transmitting a signal including information about its radio environment, and means for configuring its receiver resources for processing received data signals and interference.

According to a fourth aspect of the present invention there is provided a primary station for use in a packet data transmission system, the primary station comprising a plurality of antennas, signal transmitting and receiving means, and means responsive to a received signal from a secondary station for adapting the mode of transmission of the signals transmitted to the secondary station.

The present invention will now be described, by way of example, with reference to the accompanying drawings, wherein.

In the drawings the same reference numerals have been used to indicate corresponding features.

Figure 1:
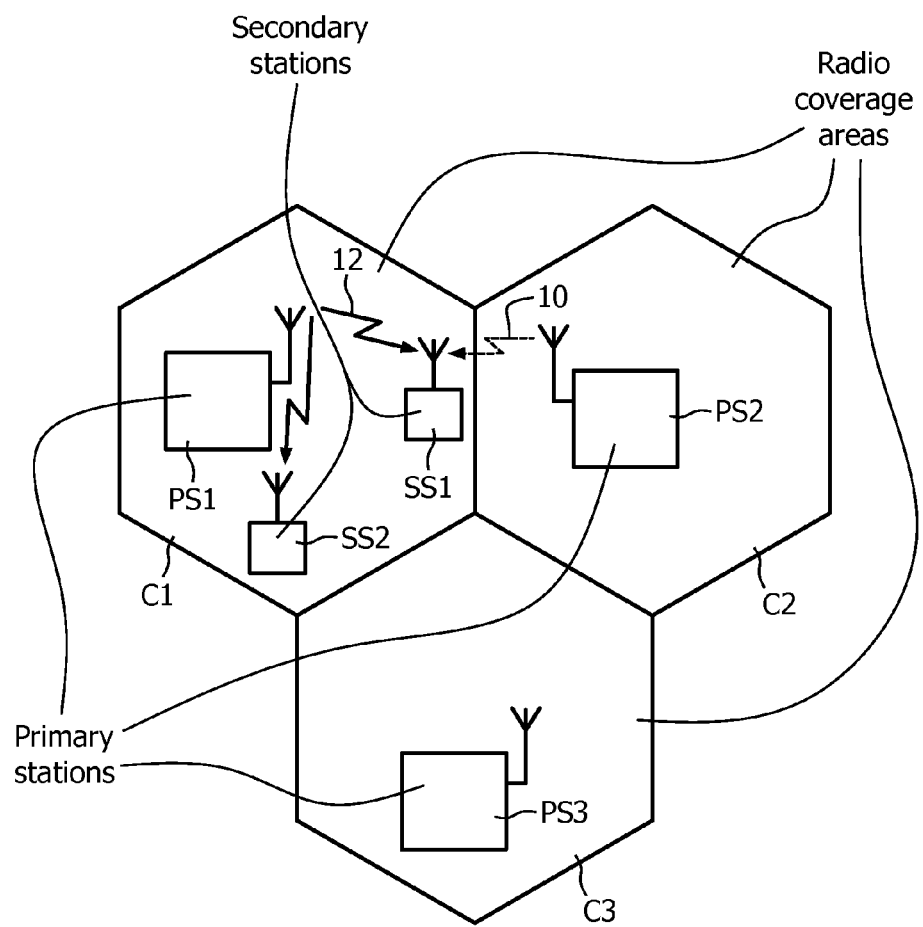
FIG. 1 is a diagram of a cellular communications system.

Referring to FIG. 1, the illustrated cellular communications system comprises primary stations PS1, PS2, PS3, each of which consists of a plurality of antennas for use in MIMO transmission of data packets on a downlink channel in accordance with a transmission system such as HSDPA and a receiver for receiving uplink signals. The primary stations will be described in greater detail later with reference to FIG.

2. The radio coverage areas C1, C2, C3, termed cells, of the primary stations are determined in part by topographical features which affect signal propagation. For convenience of illustration the cells are shown as equal sized regular hexagons.

Secondary stations SS1 and SS2 are able to roam within the overall coverage area determined by the cells C1, C2, C3. Each secondary station SS1, SS2 comprises a plurality of antennas which may be used for MIMO reception and a transmitter for sending uplink signals.

The operation of the cellular communications system is conducted in accordance with a standard such as UMTS, details of which are incorporated by way of reference. Consequently aspects such as handover will not be discussed in the present specification as they are not relevant to the understanding of the present invention.

Taking the secondary station SS1 as an example, as it roams within the cell C1, the quality of reception of the MIMO signals transmitted by the primary station PS1 will vary according to not only the distance from the primary station PS1 but also the distance from the primary station PS2 in the adjoining cell C2. As the secondary station SS1 approaches the notional boundary between the cells C1, C2 the level of interfering signals 10 transmitted by the primary station PS2 increases and has an adverse effect on the reception quality of the wanted signal 12 received from the primary station PS1. Effective interference cancellation of the interfering signals 10 can be implemented by the secondary station SS1 because the format of the signals 10 is known.

Figure 2:
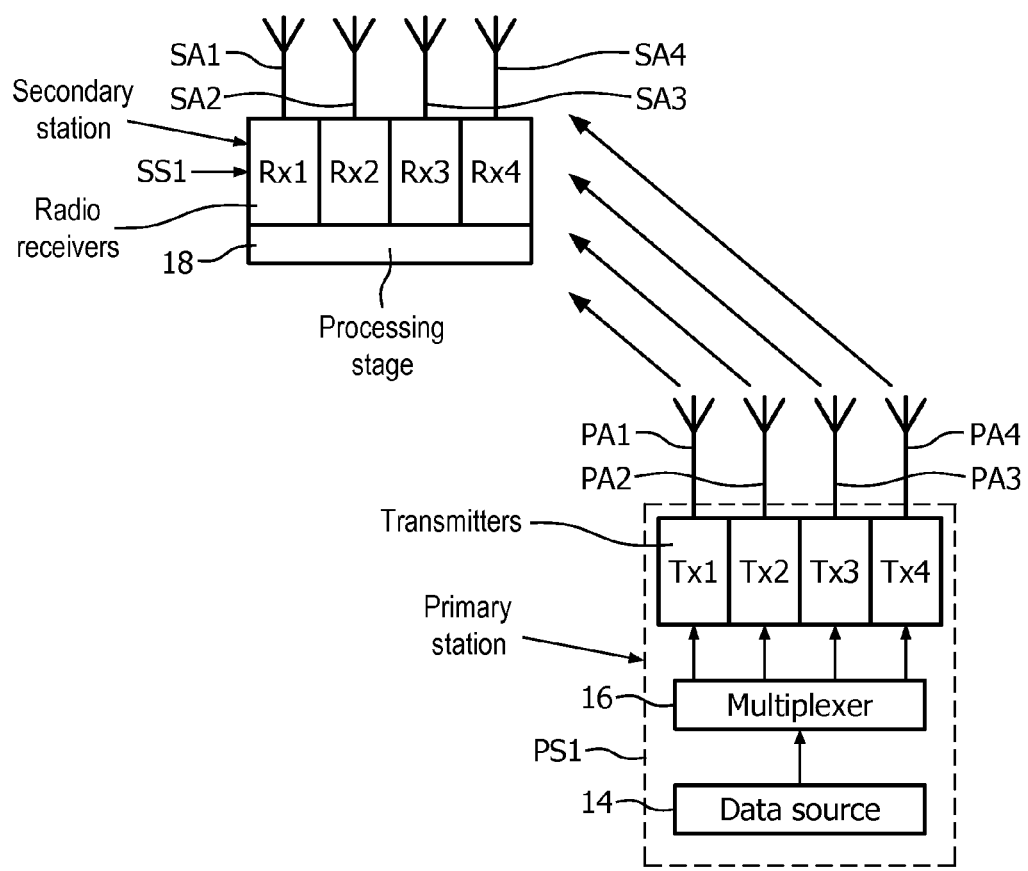
FIG. 2 is a block schematic diagram of a MIMO system without interference.

Referring to FIG. 2, the illustrated example of a MIMO system comprises a primary station PS1 having a single source 14 of data coupled to a multiplexer 16 having four outputs coupled to respective transmitters Tx1, Tx2, Tx3, Tx4, each having its own antenna PA1, PA2, PA3, PA4. In operation separate packet data streams using the same channelisation code may be transmitted on a downlink by respective ones of the transmitters Tx1 to Tx4. Although not shown in the drawing, the primary station has a receiver for receiving uplink signals and a processor for controlling the operation of the primary station PS1.

An in-range secondary station SS1 present in the same cell as the primary station PS1 receives the separate packet data streams, decodes them and combines the decoded data. As an example, the secondary station SS1 comprises as many radio receivers Rx1, Rx2, Rx3, Rx4 as there are transmitters Tx1 to Tx4. Each of the receivers Rx1 to Rx4 has its own antenna SA1 to SA4. The received signals are passed to a processing stage 18 which recovers the transmitted packet data streams and recombines the data. The processing stage 18 also causes other functions to be carried-out such as monitoring the quality of the downlink channels, selecting modes of operation of the antennas SA1 to SA4 and their associated receivers Rx1 to Rx4 and the transmitting of uplink signals by way of a transmitter, not shown.

In the simplest case, each data stream is mapped to a separate one of the antennas PA1 to PA4, which is appropriate for spatially uncorrelated radio channels. However the mapping may take into account the quality of the downlink path between each pair of the antennas, that is one of antennas PA1 to PA4 and one of antennas SA1 to SA4.

Figure 3:
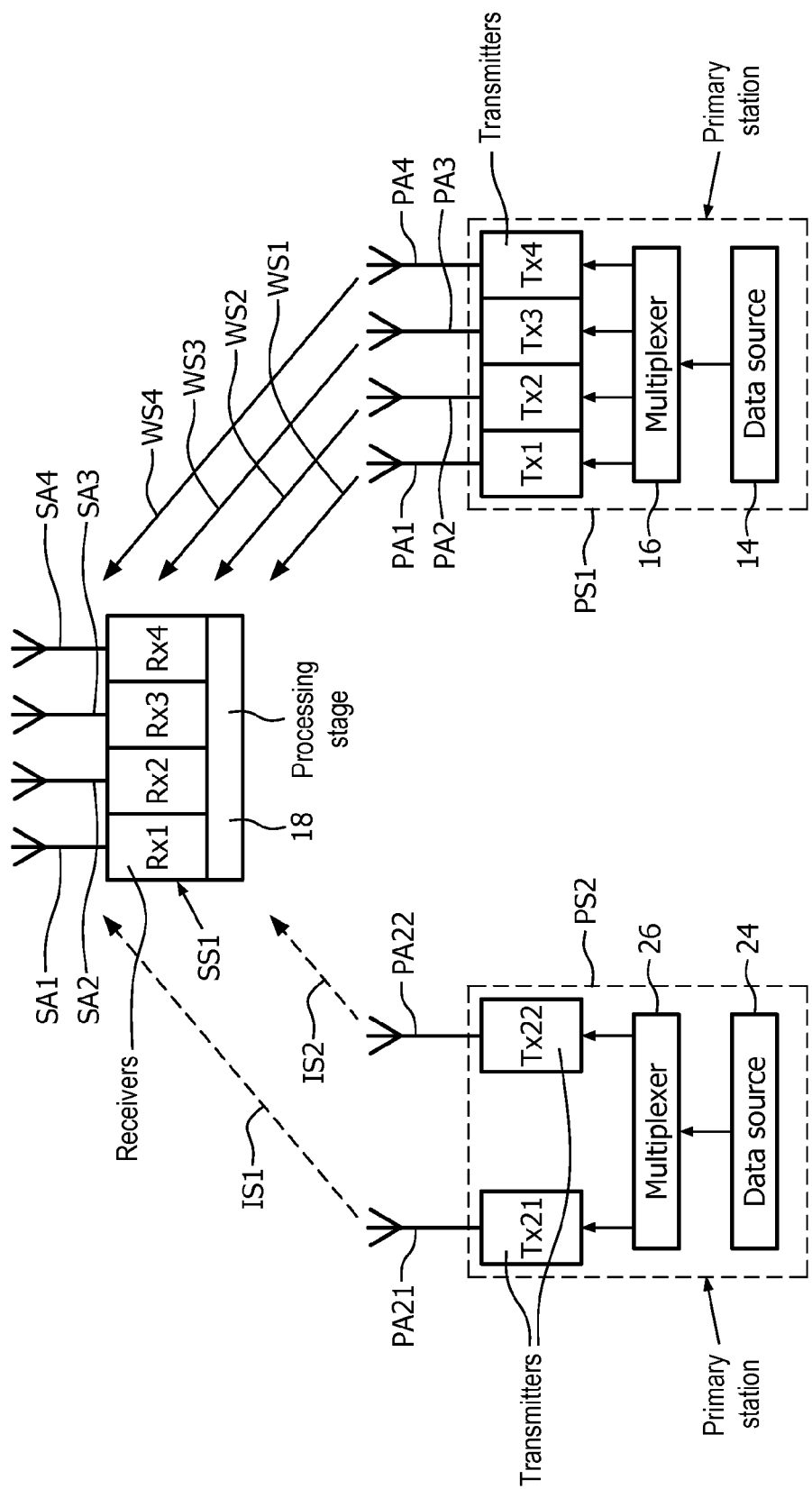
FIG. 3 is a block schematic diagram of a MIMO system with interference.

Referring to FIG. 3 which shows a 4×4 MIMO arrangement, wanted downlink signals WS1 to WS4 are subject to the combined power of two interferers (or interfering signals) IS1, IS2 produced by transmitters Tx21 and Tx22 of a primary station PS2 located in an adjacent cell. For the sake of completeness, the primary station PS2 includes a data source 24 coupled to a multiplexer 26 which supplies respective data streams to the transmitters Tx21, Tx22, each of which has an antenna PA21, PA22.

Figure 4:
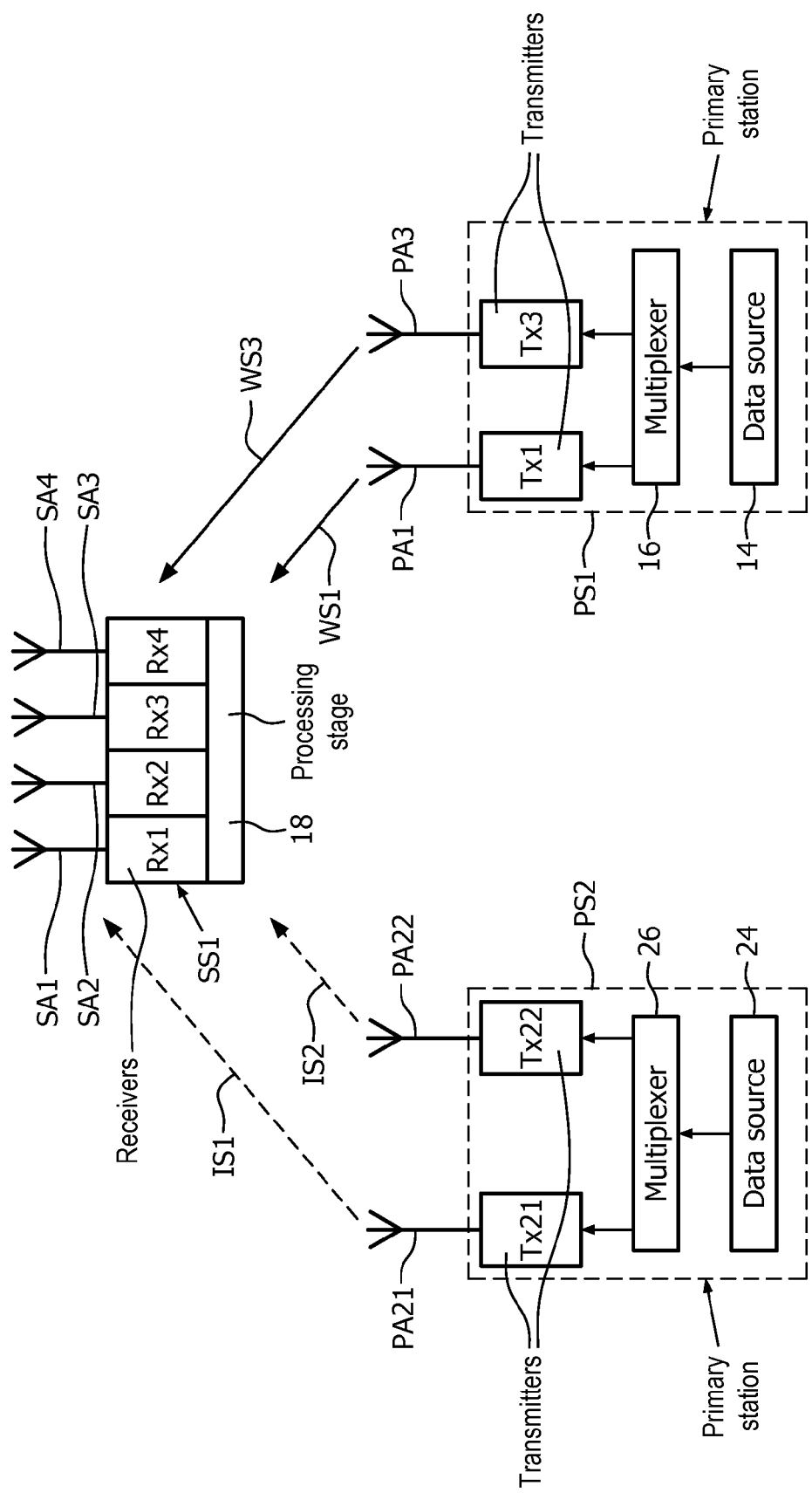
FIG. 4 is a block schematic diagram of a MIMO system with interference cancellation by a secondary station.

The combined power of the two interferers IS1, IS2 degrades the combined wanted signal received at the secondary station SS1. In order to reduce, and preferably eliminate, the effect of these interferers, some of the receiver resources are allocated to interference cancellation. This is shown in FIG. 4.

In general the number of interference sources which can be cancelled by for example linear combination of antenna outputs is equal to the number of receiver antennas minus the number of wanted signals to be received. In FIG. 4 the secondary station SS1 has configured its receiver resources for receiving wanted downlink signals WS1 and WS3 from transmitters Tx1 and Tx3 of the primary station PS1 and is also cancelling interference from the interferers IS1, IS2.

In selecting transmitted signals for reception and interferers for cancellation, the secondary station SS1 may use one or more criteria determined by the secondary station SS1, for example, (1) level of interference in channels between pairs of interfering transmitter and receiver antennas, (2) the transfer functions of channels between pairs of transmitter and receiver antennas, (3) channel quality for selected transmission formats, (4) the secondary station selecting the antenna coefficients for virtual antennas in order to optimise some parameter or parameters (for example minimise interference, maximise expected throughput), and (5) the number (or effective number) of receive antennas at the secondary station being a dynamic quantity.

Once the secondary station has made a contemporaneous decision how it would like to allocate its receiver resources it transmits the relevant information as an uplink signal. The relevant information can take a multitude of forms, for example, (a) interference level at each of the receiver antennas SA1 to SA4, (b) the interference level defined with respect to a reference, where the reference for interference could be one receive antenna, (c) interference information for selected antennas only, (d) any one of (a) to (c) above with selection of antennas based on interference (for example, lowest interference level), (e) any one of (a) to (c) above with selection of antennas based on interference after cancellation (for example lowest interference level after cancellation using one or more spare receive antennas), (f) the transfer function between each pair of transmit and receive antennas, where the transfer function could be limited to a single complex number, (g) transfer function normalised with respect to interference level at a receiving antenna, (h) transfer function defined with respect to a reference, where the reference for transfer function could be one antenna pair, (i) transfer function information for selected pairs of antennas only, (j) any one of (f) to (i) above with the selection of antenna pairs based on transfer function (for example, lowest path loss), (k) transfer function normalised with respect to interference level at the receiving antenna, after cancellation, (l) any one of (f) to (k) above with selection of antenna pairs based on transfer functions after interference cancellation, (m) the channel quality for each antenna pair for each possible transmission format and allocation of resources, (n) channel quality defined in terms of SNR for each antenna pair, (o) channel quality defined in terms of bit rate achievable (that is code rate), (p) channel quality defined in terms of a recommended transmission format, (q) channel quality information for selected transmission formats only, (r) any of (m) to (q) above with selection of transmission formats based on expected throughput, (s) any of (m) to (q) above with selection of transmission formats from among a sub-set of possible formats, (t) any of the above with receive antennas as "virtual antennas" derived from linear combinations of signals from real antennas at the secondary station, (u) any of the above with the number of virtual antennas less than or equal to the number of real antennas, (v) any of the above with the secondary station selecting the coefficients to obtain virtual antennas in order to optimise some parameter or parameters (for example minimise interference, maximise expected throughput), (w) any or none of the above where the number of receive antennas the secondary station indicates to the primary station depends on channel conditions, (x) maximum desired number of receivable transmission antennas, and (y) specific selection of transmit antennas.

The primary station in response to the uplink signals may adapt (1) the transmission scheme in general (for example space time coding, diversity, MIMO techniques, mapping of data to antennas, power allocation), (2) the number of transmit antennas used, (3) the allocation of the transmit antennas, and (4) allocation of (unused) antennas to signals for other users.

Depending on the desired speed of response by the primary station, at least part of the relevant information could be signalled at the physical layer which will produce a faster response than using say the protocol layer.

Figure 5:
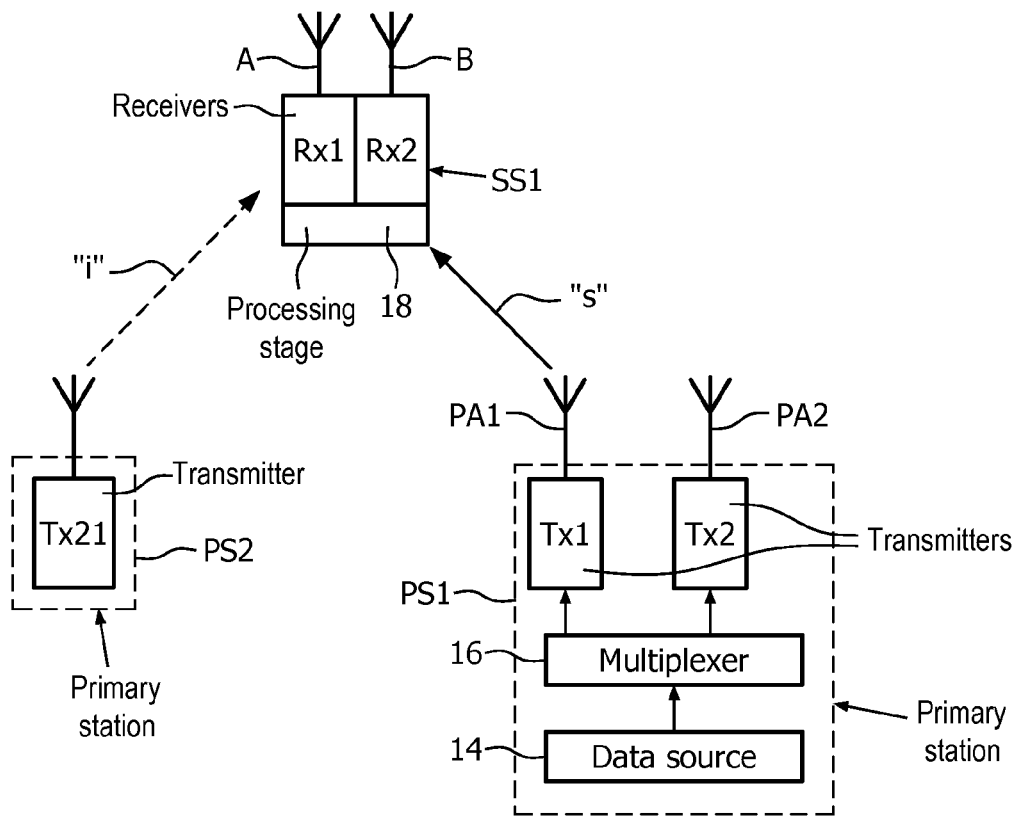
FIG. 5 is a block schematic diagram of a simplified MIMO system with Interference cancellation.

FIG. 5 illustrates a simplified MIMO system with interference cancellation. In order to illustrate the operation of the interference cancellation scheme mathematically the wanted signal is referenced "s", the interfering signal is referenced "i", and the secondary station antennas are referenced "A" and "B", respectively.

The channel transfer functions are: $h_{iA}$, $h_{iB}$, $h_{sA}$ and $h_{sB}$.

If the received signals at antennas A and B are combined with weights "1" and "a", respectively, the receiver output is:

$$s \cdot h_{sA} + i \cdot h_{iA} + s \cdot a \cdot h_{sB} + i \cdot a \cdot h_{iB}$$

With no noise, interference cancellation is obtained by choosing:

$$a = -h_{iA}/h_{iB}$$

In this case the wanted signal would be:

$$s(h_{sA} - (h_{sB} \cdot h_{iA}/h_{iB}))$$

The channel coefficients could be obtained by measurement of pilot symbols from each of the antennas. This approach can be extended to calculation of optimum combining weights in the presence of noise, and with more than one transmitter antenna in operation.

In applying this concept to a combination of MIMO and HSDPA in a system such as UMTS, the primary station would select the modulation, coding scheme and other relevant characteristics to be used in the downlink for transmission to a predetermined secondary station. This selection would take into account channel information provided by the secondary station. In making the selection the primary station would decide on the use of one or more antennas and whether MIMO (or other diversity techniques) would be used.

The channel information could be provided in terms of the received (complex) amplitude of the pilot symbols sent from the primary station, together with the interference level at the secondary station. Optionally it is possible to normalise the pilot amplitude by the interference level, allowing for different interference at each antenna.

If the primary station is to make the decision on how many transmit antennas to use, it would need to know all of the channel coefficients (including those for the interferer) as well as the capability of the secondary station to cancel interference. This would require a significant signalling load.

Allowing the secondary station to make all or some of the decisions would reduce the potential signalling load.

If a particular signalled pilot amplitude is assigned to indicate a low or zero pilot amplitude, this value could also be used by the mobile to indicate that the corresponding antenna should not be used for transmission. This would allow the secondary station to at least partly determine how many transmit antennas are to be used by the primary station. Therefore the secondary station could ensure that it had sufficient resources to carry out interference cancellation (if needed).

In another situation, if full MIMO is applied (using all the receiver antennas), the secondary station might determine that only part of the downlink data can be reliably recovered. If so, the secondary station may be able to use the resulting extra degree(s) of freedom to cancel interference.

Figure 6:
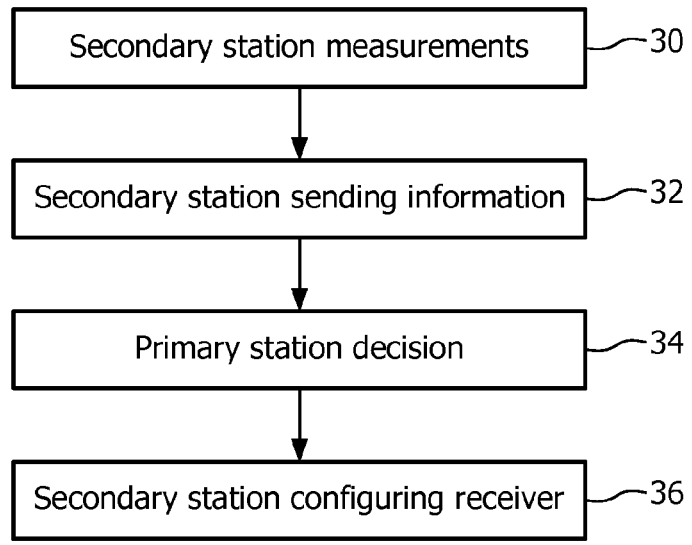
FIG. 6 is a flow chart illustrating an embodiment of the method in accordance with the present invention.

Referring to FIG. 6, the flow chart comprises a block 30 which relates to a secondary station making measurements about its radio environment which measurements include measuring the channel characteristics between each path of the channel and measuring the characteristics of the interferers. Block 32 relates to the secondary station sending information about the measurements made to a primary station. This information may also include a recommendation on the transmission format to be used and/or the number of antennas or a specific choice of antennas or subset of antennas. Block 34 relates to the primary station making a decision on the transmission format and/or antennas to be used. In one example of making a decision the primary station follows the recommendation of the secondary station which has the advantage of reducing the amount of downlink signalling that may be necessary. In another example the primary station informs the secondary station what it is going to do which may be part or all of the secondary station's recommendation. Finally block 36 relates to the secondary station deciding what to do with the received transmissions and interference and configuring its receiver resources accordingly.

Depending on the implementation of the MIMO system the secondary station may have more or less autonomy in the decision making.

Although the present invention is aimed at a FDD (Frequency Division Duplex) mode of operation it can be applied to a TDD (Time Division Duplex) mode if the uplink and downlink channel use different time slots at the same frequency. In the TDD mode the channel will be reciprocal and the need for the signalling of channel information reduced.

The roles performed by a primary station in the above description may in practice be the responsibility of a variety of parts of the fixed infrastructure, for example a "Node B", which in UMTS is the part of the fixed infrastructure directly interfacing with a secondary station, or at a higher level in the Radio Network Controller (RNC). In this specification, the use of the term "primary station" should therefore to be understood to include the parts of the network fixed infrastructure involved in an embodiment of the present invention.

Although the description above relates to certain roles for a primary station and a secondary station, it will be understood that these roles may be reversed in some embodiments of the present invention.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of packet data transmission systems and component parts thereof and which may be used instead of or in addition to features already described herein.

The invention claimed is:

1. A method of operating a packet data transmission system comprising a primary station having a plurality of antennas and at least one secondary station having a plurality of antennas, where the primary station is configured for transmitting packet data on signal paths between pairs of primary and secondary station antennas, the method comprising:
   monitoring, by a secondary station, a radio environment of the packet data transmission system;
   sending, by the secondary station, radio environment information to the primary station, the radio environment information including at least one of a measured level of interference between pairs of antennas, a transfer function of channels between the pairs of antennas, or a number of antennas at the secondary station; and
   configuring, by the secondary station, receiver resources of the secondary station for processing received data and interference by choosing, based on the radio environment information, selected ones of the plurality of antennas of the secondary station to receive interference signals for interference signal cancellation.

2. The method of claim 1, wherein the secondary station is configured to transmit a recommendation such that the primary station is enabled to adapt a mode of signal transmission to the secondary station, in accordance with the recommendation.

3. The method of claim 2, wherein the recommendation comprises the number of antennas or a subset of antennas for the primary station to use when transmitting packet data to the secondary station.

4. The method of claim 2, wherein the recommendation comprises a maximum desired number of receivable transmission antennas to be used by the primary station.

5. The method of claim 2, wherein the recommendation comprises a transmission format to be used by the primary station.

6. The method of claim 2, wherein the radio environment information further comprises antenna coefficients which enable the primary station to optimize at least one parameter of virtual antennas of the secondary station.

7. The method of claim 1, wherein the secondary station determines the resources to be used for receiving packet data and the resources to be used for interference cancellation, and wherein a number of interference sources which can be cancelled by a linear combination of antenna outputs is equal to a number of receiver antennas minus a number of signals to be received from the primary station.

8. The method of claim 3, wherein the secondary station monitors a transfer function of paths between antennas of the primary station and the secondary station.

9. The method of claim 1 wherein the level of interference between the pairs of antennas includes interference in channels between pairs of interfering transmitter and receiver antennas.

10. The method as claimed in claim 1, further comprising the secondary station configuring its receiver resources for processing the received data and interference by choosing, based on characteristics of channel transfer functions between interference sources and the secondary station antennas, selected ones of the plurality of the secondary station antennas for receiving interference signals for interference cancellation.

11. The method of claim 1, wherein receiving the interference signals for interference signal cancellation comprises reducing or eliminating an effect of the interference signals on desired signals.

12. A secondary station for use in a packet data transmission system having a primary station with a plurality of antennas, the secondary station comprising:
   signal transmitting and receiving means;
   a plurality of antennas;
   means for monitoring a radio environment of the packet data transmission system; and
   means for transmitting a signal including radio environment information, the radio environment information including at least one of a measured level of interference between pairs of transmitter and receiver antennas, a transfer function of channels between pairs of transmitter and receiver antennas, and a number of antennas at the secondary station;
   and
   means for configuring receiver resources of the secondary station, the receiver resources being configured for processing received data signals and interference by choosing, based on the radio environment information, selected ones of said plurality of antennas of the secondary station to receive interference signals for interference signal cancellation.

13. The secondary station of claim 12, wherein the secondary station determines the resources to be used for receiving packet data and the resources to be used for interference cancellation, and wherein a number of interference sources which can be cancelled by a linear combination of antenna outputs is equal to a number of receiver antennas minus a number of signals to be received from the primary station.

14. A packet data transmission system comprising:
   at least one secondary station having a plurality of antennas, the at least one secondary station comprising a processor being configured to:
      monitor a radio environment of the packet data transmission system;
      transmit a signal including radio environment information, the radio environment information including at least one of a measured level of interference between pairs of transmitter and receiver antennas, a transfer function of channels between pairs of transmitter and receiver antennas, or a number of antennas at the secondary station; and
      configure receiver resources of the secondary station to process received interference and data signals by choosing, based on the radio environment information, selected ones of antennas of the secondary station to receive interference signals for interference signal cancellation; and
   a primary station having a plurality of antennas, the primary station being configured to allocate transmission resources based on the radio environment information.

15. The packet data transmission system of claim 14, wherein the number of antennas selected is based on a recommended number of antennas for the primary station to use when transmitting packet data to the secondary station.

16. The packet data transmission system of claim 14, wherein the radio environment information further includes antenna coefficients which enable the primary station to optimize at least one parameter of virtual antennas of the secondary station.

17. The packet data transmission system of claim 14, wherein the level of interference between antenna pairs includes interference in channels between pairs of interfering transmitter and receiver antennas.

18. The packet data transmission system of claim 14, wherein, to receive the interference signals for interference signal cancellation, the processor is configured to reduce or eliminate an effect of the interference signals on desired signals.

19. A secondary station for use in a packet data transmission system, the secondary station comprising:
a plurality of antennas; and
a processor coupled to the plurality of antennas, the processor being configured to:
monitor a radio environment of the packet data transmission system;
transmit a signal including radio environment information to a primary station, the radio environment information including at least one of a measured level of interference between pairs of transmitter and receiver antennas, a transfer function of channels between pairs of transmitter and receiver antennas, or a number of antennas at the secondary station; and
choose, based at least partially on the radio environment information, selected ones of the plurality of antennas to receive interference signals for interference signal cancellation.

20. The secondary station of claim 19, wherein the number of antennas selected is based on a recommended number of antennas for the primary station to use when transmitting packet data to the secondary station.

21. The secondary station of claim 19, wherein the radio environment information further includes antenna coefficients which enable the primary station to optimize at least one parameter of virtual antennas of the secondary station.

22. The secondary station of claim 19, wherein the level of interference between antenna pairs includes interference in channels between pairs of interfering transmitter and receiver antennas.

23. The secondary station of claim 19, wherein the processor is configured to determine resources to be used for receiving packet data and resources to be used for interference cancellation, and wherein a number of interference sources which can be cancelled by a linear combination of antenna outputs is equal to a number of receiver antennas minus a number of signals to be received from the primary station.

24. The secondary station of claim 19, wherein the processor is configured to allocate resources for processing the received data and interference by choosing, based on characteristics of channel transfer functions between interference sources and the plurality of antennas, selected ones of the plurality of antennas for receiving interference signals for interference cancellation.

25. The secondary station of claim 19, wherein, to receive the interference signals for interference signal cancellation, the processor is configured to reduce or eliminate an effect of the interference signals on desired signals.

26. A primary station for use in a packet data transmission system, the primary station comprising:
a plurality of antennas; and
a processor coupled to the plurality of antennas, the processor being configured to:
receive a signal including radio environment information from a secondary station, the radio environment information including at least one of a measured level of interference between pairs of transmitter and receiver antennas, a transfer function of channels between pairs of transmitter and receiver antennas, and a number of antennas at the secondary station; and
allocate, based on the radio environment information, transmission resources of the plurality of antennas for transmission of communication signals to the secondary station such that the secondary station is enabled to choose, based on the radio environment information, selected ones of antennas of the secondary station to receive interference signals for interference signal cancellation.

27. The primary station of claim 26, wherein the processor is configured to receive a recommendation from the secondary station, and wherein the processor is configured to adapt a mode of signal transmission to the secondary station based on the recommendation.

28. The primary station of claim 27, wherein the recommendation comprises the number of antennas or a subset of antennas for the primary station to use when transmitting packet data to the secondary station.

29. The primary station of claim 27, wherein the recommendation comprises a maximum desired number of receivable transmission antennas to be used by the primary station.

30. The primary station of claim 27, wherein the recommendation comprises a transmission format to be used by the primary station.

31. The primary station of claim 26, wherein radio environment information further includes antenna coefficients, and wherein the processor is configured to optimize at least one parameter of virtual antennas of the secondary station based on the antenna coefficients.

* * * * *